United States Patent

Schaefer et al.

[11] Patent Number: 5,988,768
[45] Date of Patent: Nov. 23, 1999

[54] HYDRAULIC BRAKING SYSTEM FOR ROAD VEHICLES, IN PARTICULAR PASSENGER CARS

[75] Inventors: Ernst-Dieter Schaefer, Brackenheim; Eberhardt Schunck, Landau; Andreas Kaessmann, Gerlingen, all of Germany

[73] Assignee: Robert Bosch GmbH, Stuttgart, Germany

[21] Appl. No.: 09/077,799

[22] PCT Filed: Sep. 24, 1996

[86] PCT No.: PCT/DE96/01806

§ 371 Date: Jun. 15, 1998

§ 102(e) Date: Jun. 15, 1998

[87] PCT Pub. No.: WO97/21573

PCT Pub. Date: Jun. 19, 1997

[30] Foreign Application Priority Data

Dec. 14, 1995 [DE] Germany ............... 195 46 647

[51] Int. Cl.[6] .................................................. B60T 11/16
[52] U.S. Cl. ...................................... 303/114.1; 303/113.1
[58] Field of Search ............... 303/113.4, 113.1, 303/114.1

[56] References Cited

U.S. PATENT DOCUMENTS

| | | | |
|---|---|---|---|
| 4,730,877 | 3/1988 | Seibert et al. | 303/114.1 |
| 4,777,643 | 10/1988 | Leiber | 303/92 |
| 5,332,302 | 7/1994 | Maas | 303/114.1 |
| 5,449,225 | 9/1995 | Burgdorf et al. | 303/113.1 |

FOREIGN PATENT DOCUMENTS

| | | | |
|---|---|---|---|
| 4023708 | 1/1992 | Germany | 303/113.1 |
| 2143293 | 2/1985 | United Kingdom | 303/113.1 |

*Primary Examiner*—Matthew C. Graham
*Attorney, Agent, or Firm*—Edwin E. Greigg; Ronald E. Greigg

[57] ABSTRACT

A brake system that includes a power-actuated service brake and an auxiliary brake that is actuated by muscle power. To achieve a desired characteristic curve of the pedal when the service brake is actuated, a path simulator is provided in a master cylinder. This path simulator has compression springs disposed in a pressure chamber. The pressure chamber is defined by a floating piston with a seat valve, which controls a pressure fluid-carrying connection of the pressure chamber to a pressure fluid reservoir of the master cylinder. The function of the seat valve is dependent on the stroke of a rod piston, which can displace pressure fluid from a first pressure chamber when the auxiliary brake is actuated. The path simulator is active if pressure fluid is not displaced from the first pressure chamber during the actuation of the service brake and therefore the seat valve assumes its open position.

6 Claims, 3 Drawing Sheets

HYDRAULIC BRAKING SYSTEM FOR ROAD VEHICLES, IN PARTICULAR PASSENGER CARS

PRIOR ART

The invention is based on a hydraulic brake system for road vehicles.

DE 43 43 386 A1, U.S. Pat. No. 5,544,948, has already disclosed a hydraulic brake system of this kind, with a master cylinder which has a movable piston that acts on a path simulator spring when the service brake is actuated. The spring is comprised of an elastomer with closed-pored, gas-filled cells. It produces a progressive characteristic curve of the pedal, i.e. as the brake pedal path increases, a progressively increasing opposing force comes into effect. The movement of the piston when the pedal is actuated is only possible when pressure fluid can be displaced into the reservoir from the second pressure chamber of the master cylinder. To this end, a line connection is established, which leads from the master cylinder, contains an electromagnetically switchable shutoff valve, and leads into the pressure fluid reservoir. Furthermore, an electronic control unit is provided for controlling this shutoff valve, the booster pressure source, and other solenoid valves that are used for brake pressure modulation in wheel brake cylinders. Apart from the fact that the spring can cause problems in long-term behavior, it requires a special embodiment of the control unit in order to control the shutoff valve, which makes the brake system more costly.

ADVANTAGES OF THE INVENTION

The hydraulic brake system according to the invention has the advantage over the prior art that the electromagnetically switchable shutoff valve is replaced by one that is mechanically controlled, which permits a simplification of the control unit. When the service brake is active, the first valve is closed so that the third valve keeps the communication open between the second pressure chamber of the master cylinder and the pressure fluid reservoir, and the path simulator spring is actuated. However, if the service brake fails and the first pressure chamber of the master cylinder communicates with the brake circuit, then after a partial stroke of the first piston, the third valve shuts off the exchange of pressure fluid from the second pressure chamber to the pressure fluid reservoir. The path simulator spring is therefore not active.

The embodiment of the invention achieves a space-saving disposition of the third valve. In addition, no connecting lines disposed outside the master cylinder are required between the third valve and the pressure fluid reservoir.

Because of the mechanical coupling of the tappet to the first piston, the modification of the brake system according to the invention distinguishes itself by means of a high functional reliability of the third valve.

When the service brake is active and the second piston can therefore be moved, the embodiment of the second piston achieves in a simple manner an always constant communication between the second pressure chamber and the pressure fluid reservoir.

The embodiment of the invention discloses a path simulator spring which is resistant to pressure fluid and maintains constant properties over the service life of the vehicle.

An embodiment that is favorable for technical manufacturing reasons, particularly in two-circuit master cylinders, is found with a modification of the invention, because it avoids the necessity of finely machining a very deep bore.

BRIEF DESCRIPTION OF THE DRAWINGS

An exemplary embodiment of the invention is shown in simplified form in the drawings and will be explained in more detail in the description below.

DESCRIPTION OF THE EXEMPLARY EMBODIMENTS

Figure 1:
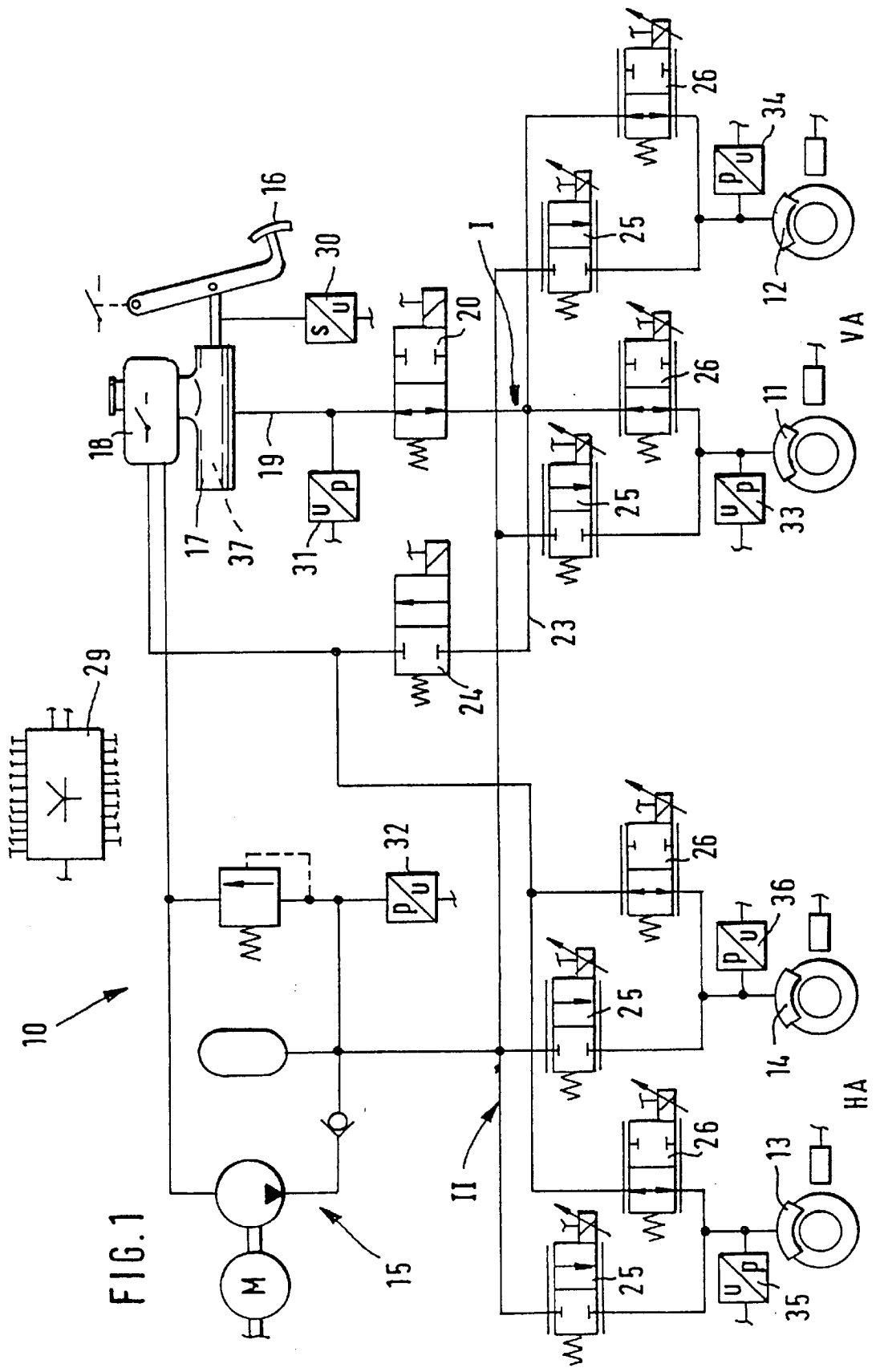
FIG. 1 shows a circuit diagram of a hydraulic brake system for passenger vehicles.

A hydraulic brake system 10 for passenger vehicles, which is represented in FIG. 1, has a brake circuit I associated with the wheel brakes 11, 12 of the front axle, VA, of the vehicle and a brake circuit II associated with the wheel brakes 13, 14 of the rear axle, HA. A booster pressure source 15 is connected to both brake circuits I and II and supplies the energy required for generating a brake force. The brake system 10 therefore has a power-actuated service brake. The brake system 10 also includes an auxiliary brake that is actuated by muscle power. This has a master cylinder 17 with a pressure fluid reservoir 18 and can be actuated by means of a brake pedal 16. The master cylinder 17 is embodied as having a single circuit, i.e. it communicates with the brake circuit I by means of a line 19 and a first valve 20 disposed in this line. In the position of the valve 20 shown, therefore, the auxiliary brake only acts on the wheel brakes 11 and 12 of the front axle, VA. When the service brake is active, the valve 20 shuts off the communication between the master cylinder and the wheel brakes 11 and 12. The first valve 20 associated with the master cylinder 17 will therefore be called a shutoff valve below.

The booster pressure source 15 aspirates pressure fluid from the reservoir 18 of the master cylinder 17 and prestresses it at high pressure for the function of the service brake. Pressure fluid withdrawn from the wheel brakes 11 to 14 during the functioning of the service brake is returned to the reservoir 18. A shutoff valve 24 is disposed in a line 23 that leads to the pressure fluid reservoir in order to cut off the brake circuit I in relation to the pressure fluid reservoir 18 when the auxiliary brake is active. In addition, each wheel brake 11 to 14 is associated with two valves 25 and 26 for brake pressure modulation when the service brake is active.

The brake system 10 is equipped with an electronic control unit 29, which in addition to the valves 20, 24, 25, and 26, is connected to a path sensor 30, which detects the path of the brake pedal 16, and six pressure sensors 31 to 36, which can detect the pressure produced by the master cylinder 17, the pressure produced by the booster pressure source 15, and the pressures controlled in the wheel brakes 11 to 14. While the auxiliary brake hydraulically functions in a conventional manner, without the cooperation of the control unit 29, the service brake operates electrohydraulically, i.e. when the driver of the passenger vehicle actuates the brake pedal 16, the electrical path signal detected by the path sensor 30 and, if need be, other electrical signals are evaluated by the electronic control unit 29, which is for controlling the valves 20, 24, 25, and 26, in order to generate brake pressure in the wheel brakes 11 to 14 that corresponds to the desired braking demand, and this brake pressure is monitored by the control unit by means of the electrical signals of the pressure sensors 31, 33 to 36. In order to give the driver the feel for the actuation of the brake pedal 16 to which he is accustomed when the service brake is active in a conventional hydraulic brake system (progressively increasing actuation force with increasing pedal path), a path simulator 37 is disposed in the master cylinder 17 and is described below in conjunction with FIGS. 2 and 3.

Figure 2:
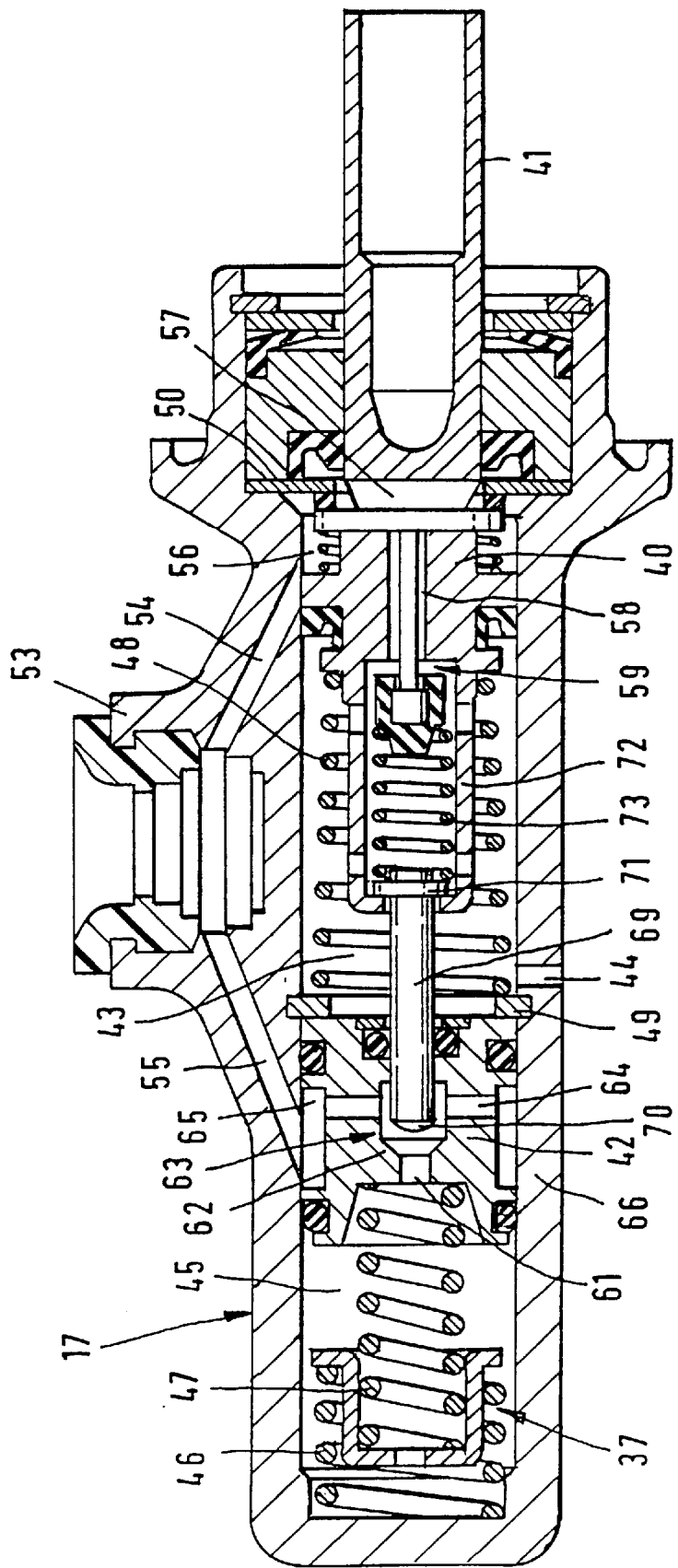
FIG. 2 is a longitudinal section through a master cylinder used in the brake system, as a first exemplary embodiment.

In the first exemplary embodiment of the master cylinder 17 represented in FIG. 2, a first piston 40 can be seen, which has a plunger rod 41 that protrudes from the master cylinder and is for the engagement of the brake pedal 16. The first piston 40 is therefore called the rod piston below. Furthermore, a second piston 42 is disposed floating in the master cylinder 17; it is referred to below as the floating piston. A first pressure fluid-filled pressure chamber 43 is disposed between the two pistons 40 and 42. This pressure chamber 43 communicates with the line 19 of the brake circuit I by means of a connection 44. Remote from the rod piston, the floating piston 42 defines a second pressure chamber 45, likewise filled with pressure fluid, and two compression springs 46, 47 of the path simulator 37 are disposed in this second pressure chamber 45. The two compression springs 46, 47 that are connected in series are supported on one end against the floating piston 42 and on the other end against the master cylinder 17. The first pressure chamber 43 likewise contains a compression spring 48, which on one end engages the rod piston 40 and is supported on the other end against a stop ring 49 for the floating piston 42. As is shown, when the brake pedal 16 is not actuated, the floating piston 42 is supported against the stop ring 49 due to the action of the path simulator springs 46, 47 and the rod piston 40 is supported against a stop 50 of the master cylinder 17 due to the spring force of the compression spring 48.

The first pressure chamber 43 and the second pressure chamber 45 communicate with the pressure fluid reservoir 18 in the indicated position of the two pistons 40 and 42. To this end, two connecting bores 54 and 55 are provided, which lead from a fitting 53 of the master cylinder 17, which fitting is for receiving the pressure fluid reservoir 18. At the rod piston 40, the connecting bore 54 feeds into a circumferential groove 56 that communicates with an opening 57 of the rod piston. Leading from the opening 57, the rod piston 40 has a coaxial through bore 58, which feeds into the first pressure chamber 43. The through bore 58, which is open in the rest position of the rod piston 40, can be shut off with a small piston stroke by means of a central valve 59. This central valve 59 constitutes the second valve associated with the master cylinder 17.

The floating piston 42 is likewise provided with a coaxial through bore 61. A valve seat 62 of a seat valve 63 is embodied in the floating valve 42 in the course of this through bore 61. After the valve seat, a lateral bore 64 leads from the through bore 61 and feeds into a circumferential groove 65 of the floating piston 42. This circumferential groove 65 is sealed on both sides in relation to the jacket 66 of the master cylinder 17. Since the connecting bore 55 mentioned coincides with the circumferential groove 65 at least in the rest position of the floating piston 42, this consequently produces the above-mentioned pressure fluid-carrying connection between the second pressure chamber 45 and the pressure fluid reservoir 18.

The seat valve 63, which constitutes the third valve associated with the master cylinder 17, includes a tappet 69 with a closing body 70 that is matched to the valve seat 62.

The tappet 69 is guided from the end of the rod piston 40 in a sealed and longitudinally mobile fashion. Remote from the closing body, the tappet 69 has a collar 71, which is contained in the first pressure chamber 43 inside a sleeve-shaped extension 72 of the rod piston 40. A captive compression spring 73 is disposed in the extension 72 and on the one hand, constitutes the closing spring of the central valve 59 and on the other hand, holds the collar 71 of the tappet 69 against the bottom of the extension 72. The compression spring 73 permits a movement of the tappet 69 toward the rod piston 40. In the indicated position of the rod piston 40, floating piston 42, and tappet 69, the closing body 70 has a larger spacing from the valve seat of the seat valve 63 than the closing stroke of the central valve 59. In other words: the closing stroke of the seat valve 63, which controls the communication between the second pressure chamber 45 and the pressure fluid reservoir 18, is greater than the closing stroke of the central valve 59, which controls the communication between the first pressure chamber 43 and the pressure fluid reservoir. The central valve 59 is one that is switched as a function of the rod piston 40 stroke; due to the mechanical coupling of the tappet 69 to the rod piston 40, this is likewise true for the seat valve 63.

Figure 3:
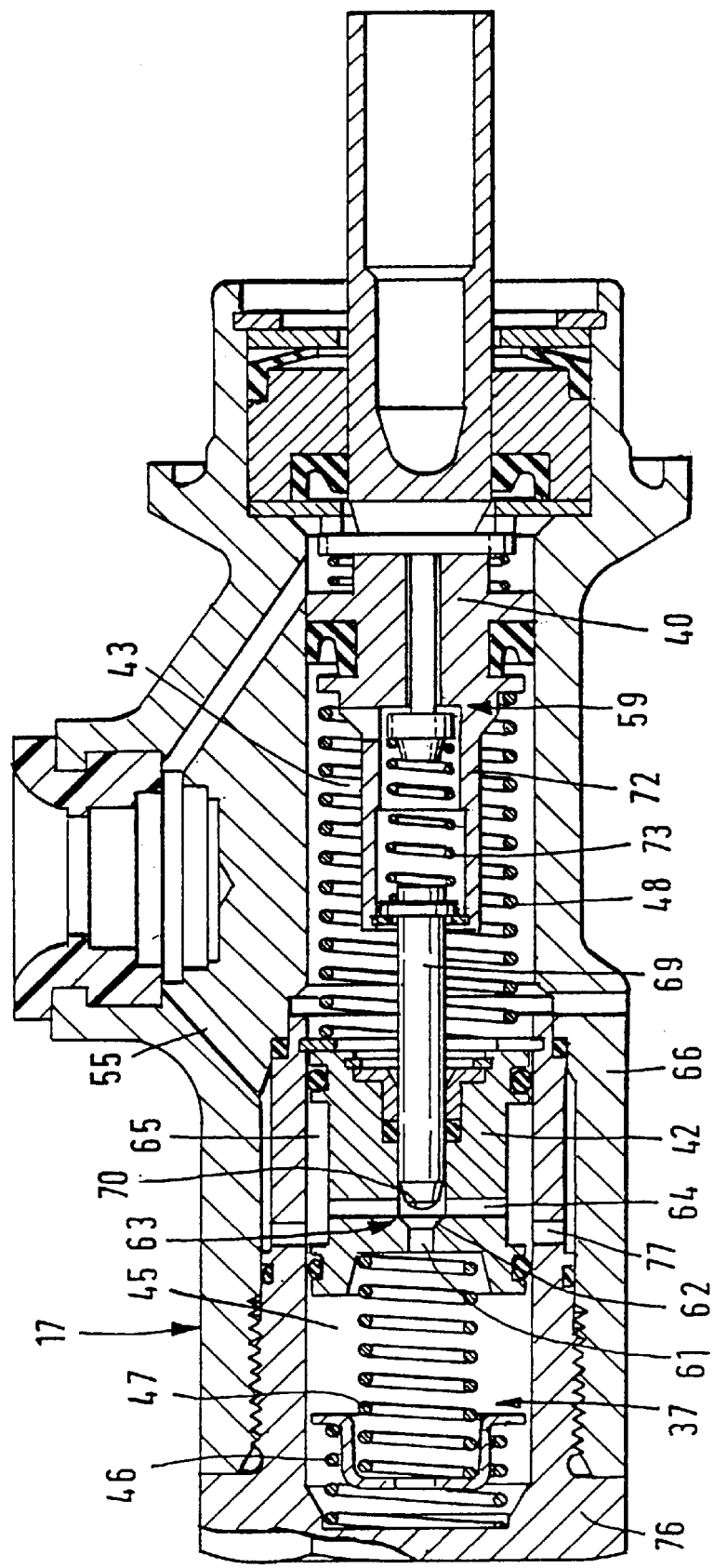
FIG. 3 is a longitudinal section through a master cylinder that has been modified in relation to FIG. 2, as a second exemplary embodiment.

The second exemplary embodiment of the master cylinder 17 represented in FIG. 3 is largely identical in terms of structure to the one according to FIG. 2. It essentially differs only by virtue of the fact that the floating piston 42 and the path simulator springs 46, 47 are disposed in a sleeve-shaped screwed-in part 76, which is screwed into the end of the master cylinder 17 remote from the pedal. On its circumferential side, the screwed-in part 76 has at least one opening 77, which communicates on the one hand with the circumferential groove 65 of the floating piston 42 and on the other hand with the connecting bore 55 to the pressure fluid reservoir 18 of the master cylinder 17.

The two exemplary embodiments of the master cylinder 17 are, as mentioned, embodied for a single-circuit auxiliary brake. The disposition according to the invention of the path simulator 37 in the master cylinder 17, however, can also be used in service brakes that have two brake circuits in the auxiliary brake. In this instance, another piston, the dividing piston, is disposed between the rod piston 40 and the floating piston 42 and divides the first pressure chamber 43 from a second pressure chamber on the side of the floating piston. This second pressure chamber communicates with the second brake circuit of the auxiliary brake. In addition, with this kind of embodiment, the tappet 69 of the seat valve 63 is coupled to the dividing piston. A two-circuit master cylinder 17, therefore, has a greater structural length than a single-circuit one. The screwed-in part 76 of the second exemplary embodiment can thus be advantageously used in a two-circuit master cylinder of this kind because this utilization facilitates the fine machining of the inside of the master cylinder jacket 66.

Within the framework of the hydraulic brake system 10, the master cylinder 17 functions as follows: when the service brake is active, the shutoff valve 20 in the line 19 severs the communication between the first pressure chamber 43 and the brake circuit I. After a short stroke of the rod piston 40, the central valve 59 shuts off the communication between the first pressure chamber 43 and the pressure fluid reservoir 18. Since the closing stroke of the seat valve 63 is a greater one than that of the central valve 59, the seat valve remains open after the closing of the central valve. The pressure fluid enclosed in the first pressure chamber 43 constitutes a hydraulic column, which simultaneously moves the floating piston 42 when the rod piston 40 is moved further. This is possible by virtue of the fact that pressure fluid can flow from the second pressure chamber 45, by way of the through bore 61, the open seat valve 63, the lateral bore 64, the circumferential groove 65, and the connecting bore 55 into the pressure fluid reservoir 18. The circumferential groove 65 is embodied as long in the axial direction so that this pressure fluid-carrying connection exists even at the maximal stroke of the floating piston 42. When the floating piston 42 is moved, the screw compression springs 46, 47 in the second pressure chamber 45 are stressed. Therefore the desired characteristic curve of the pedal is achieved, i.e. with increasing pedal path, an increase in the opposing force is produced.

When the brake pedal 16 is released, the compression spring 48 returns the rod piston 40 to its initial position and the two compression springs 46, 47 return the floating piston 42 into its initial position, in which the central valve 59 also assumes its open position.

If, however, the auxiliary brake is active, for example due to the failure of the service brake, then the two shutoff valves 20 and 24 assume the position shown in FIG. 1. As described above, actuating the brake pedal 16 moves the rod piston 40 and closes the central valve 59. Pressure fluid is displaced from the first pressure chamber 43, through the line 19 and the shutoff valve 20 into the brake circuit I and brake pressure is generated in the wheel brakes 11 and 12. Due to the displacement of pressure fluid from the first pressure chamber 43, the floating piston 42 remains in its initial position due to the prestressing of the two compression springs 46, 47 so that the tappet 69 brings the closing body 70 into engagement with the valve seat 62 and thus switches the seat valve 63 into the closed position. The closed seat valve 63 prevents pressure fluid from flowing out of the second pressure chamber 45 and into the pressure fluid reservoir 18. Consequently the floating piston 42 remains in its initial position and the two compression springs 46, 47 are not stressed. Therefore the path simulator 37 performs no function when the auxiliary brake is active. The characteristic curve of the pedal is consequently produced essentially by the elasticity of the elements of the brake system 10 belonging to the auxiliary brake.

When the rod piston 40 is moved farther toward the floating piston 42, a relative movement occurs between the tappet 69 and the rod piston, i.e. when the seat valve 63 is closed further, the tappet 69 plunges with its collar 71 deeper into the extension 72 of the rod piston 40, counter to the pre-stress force of the captive compression spring 73.

When the brake pedal 16 is released, the elements of the master cylinder 17 return to the initial position shown, as explained in the function of the service brake.

The foregoing relates to preferred exemplary embodiments of the invention, it being understood that other variants and embodiments thereof are possible within the spirit and scope of the invention, the latter being defined by the appended claims.

We claim:

1. A hydraulic brake system (10) for road vehicles, comprising a power-actuated service brake and an auxiliary brake actuated by muscle power, with the following features:

a master cylinder (17) is provided with a first pressure chamber (43) which communicates with a pressure fluid reservoir (18) and communicates with a brake circuit (I) of the brake system (10), a booster pressure source (15) is connected to the brake system, and to said fluid reservoir, the first pressure chamber (43) is defined by a first piston (40), which is moved counter to a spring force at least indirectly by means of a brake pedal (16), a second pressure chamber (45) is provided in the master cylinder (17) and is connected with the pressure fluid reservoir (18), the two pressure chambers (43, 45) are divided from each other by a second piston (42), said second piston is moved counter to a force of at least one path simulator spring (46, 47) in said master cylinder, the first pressure chamber (43) is closed off in relation to the brake circuit (I) by a first valve (20)connected to said first pressure chamber and by activation of said power-activation service brake, said first valve keeps a brake fluid communication open between the first pressure chamber (43) and the brake circuit (I) by activation of the auxiliary brake, a connection of the two pressure chambers (43, 45) in said master cylinder to the pressure fluid reservoir (18) is closed off respectively by a second and third valve (59, 63) in said master cylinder, the second valve (59) is connected with the first pressure chamber (43) and is switched as a function of a stroke of the first piston (40), the third valve (63) permits fluid to communicate between the second pressure chamber (45) and the pressure fluid reservoir (18) and said third valve is closed directly as a function of a stroke of the first piston (40), and the closing stroke of said third valve (63) is greater than that of the second valve (59), which controls fluid communication between the first pressure chamber (43) and the pressure fluid reservoir (18).

2. A brake system according to claim 1, in which the second piston (42) is a floating piston with a through opening (61, 64, 65) between the second pressure chamber (45) and the connection (53, 55) to the pressure fluid reservoir (18), and that the third valve (63) is a seat valve disposed in a course of the through opening (61, 64, 65) and a closing body (70) of this seat valve is mechanically coupled to the first piston (40).

3. A brake system according to claim 2, in which the closing body (70) is embodied on a tappet (69), which is connected to the first piston (40) and is moved in relation to said first piston, with the interposition of a captive compression spring (73).

4. A brake system according to claim 3, in which:

the second piston (42) has an axially extending through bore (61), a valve seat (62) of the seat valve (63) is disposed in the course of the through bore (61), the tappet (69) with the closing body (70) can be moved longitudinally in relation to the valve seat (62) of the seat valve (63), the tappet engages in the through bore (61), and is sealed in relation to the end of the first piston (40), on the closing body end, a lateral bore (64) leads from the through bore (61) and feeds into a circumferential groove (65) that is sealed in relation to the master cylinder jacket (66), by means of a bore (55), the master cylinder jacket (66) communicates with the pressure fluid reservoir (18) in the region of the circumferential groove (65).

5. A brake system according to claim 1, in which the path simulator spring (46, 47) is disposed in the second pressure chamber (45) and is comprised of at least one metallic screw compression spring.

6. A brake system according to claim 1, in which the second piston (42) and the path simulator spring (46, 47) are disposed in a sleeve-shaped screwed-in part (76), which is screwed into the master cylinder (17) on an end remote from the pedal and on the circumference side, has an opening (77) that communicates at least indirectly with the pressure fluid reservoir (18).

* * * * *